United States Patent
Kaethner et al.

(10) Patent No.: US 12,476,003 B2
(45) Date of Patent: Nov. 18, 2025

(54) INTERVENTION SYSTEM AND METHOD FOR SUPPORTING GROUPS OF PEOPLE IN THE USE OF AN INTERVENTION SYSTEM

(71) Applicant: Siemens Healthcare GmbH, Erlangen (DE)

(72) Inventors: Christian Kaethner, Freiburg (DE); Marcus Pfister, Bubenreuth (DE)

(73) Assignee: Siemens Healthineers AG, Forchheim (DE)

( * ) Notice: Subject to any disclaimer, the term of this patent is extended or adjusted under 35 U.S.C. 154(b) by 308 days.

(21) Appl. No.: 18/227,045

(22) Filed: Jul. 27, 2023

(65) Prior Publication Data

US 2024/0038384 A1 Feb. 1, 2024

(30) Foreign Application Priority Data

Jul. 28, 2022 (DE) ..................... 10 2022 207 751.2

(51) Int. Cl.
  *G16H 40/67* (2018.01)
  *G06F 3/04847* (2022.01)
  *G06F 3/0488* (2022.01)

(52) U.S. Cl.
  CPC ......... *G16H 40/67* (2018.01); *G06F 3/04847* (2013.01); *G06F 3/0488* (2013.01)

(58) Field of Classification Search
  None
  See application file for complete search history.

(56) References Cited

U.S. PATENT DOCUMENTS

2006/0085229 A9 * 4/2006 Rosenfeld .............. G16H 10/60
  705/3
2019/0378610 A1 * 12/2019 Barral .................... G16H 10/65
(Continued)

FOREIGN PATENT DOCUMENTS

DE  102005054140 B4 * 11/2005 ............... G06F 3/00

OTHER PUBLICATIONS

Elprama et al.; Identifying barriers in telesurgery by studying current team practices in robot-assisted surgery; 2013 7th International Conference on Pervasive Computing Technologies for Healthcare and Workshops.*
(Continued)

*Primary Examiner* — David J Stoltenberg
(74) *Attorney, Agent, or Firm* — Lempia Summerfield Katz LLC

(57) ABSTRACT

An intervention system and method for performing an intervention, for example a medical intervention, for example on a patient, at a first location, this being an intervention location. The intervention system includes at least one drivable intervention device at the first location to be used for the intervention, a first operating device provided at the first location for control of the at least one intervention device by a local group of people situated at the first location, a second operating device provided at a second location which is remote from the intervention location, for control of the at least one intervention device by a remote group of people situated at the second location, and an authorization device for authorizing the control of the at least one intervention device by the operating devices. The authorization device includes a user interface for the first location and the second location respectively, the user interface including a display unit for displaying at least the authorization state of the operating device at the respective (Continued)

location and an operating element that is configured at least to request the authorization for the operating device of the respective location.

20 Claims, 3 Drawing Sheets

(56) References Cited

U.S. PATENT DOCUMENTS

| | | | | |
|---|---|---|---|---|
| 2021/0074423 | A1 | 3/2021 | Stuart et al. | |
| 2021/0137468 | A1* | 5/2021 | Katragadda | H04L 67/12 |
| 2021/0220064 | A1* | 7/2021 | Kottenstette | A61B 90/36 |
| 2021/0241902 | A1 | 8/2021 | Wang et al. | |
| 2022/0249097 | A1* | 8/2022 | Shelton, IV | G16H 50/20 |
| 2022/0384019 | A1* | 12/2022 | Shelton, IV | G16H 50/70 |
| 2023/0368887 | A1* | 11/2023 | Roh | G16H 40/67 |
| 2024/0024065 | A1* | 1/2024 | Okumu | G06V 20/50 |

OTHER PUBLICATIONS

Uddin et al. Continuous Patient Monitoring With a Patient Centric Agent: A Block Architecture; publication Jun. 13, 2018, date of current version Jul. 6, 2018, Digital Object Identifier 10.1109/ACCESS.2018.2846779.*
Siemens Healthcare GmbH; Corindus Vascular Robotics; https://www.corindus.com/corpath-grx/how-it-works; Jun. 2022; 12 pp.

\* cited by examiner

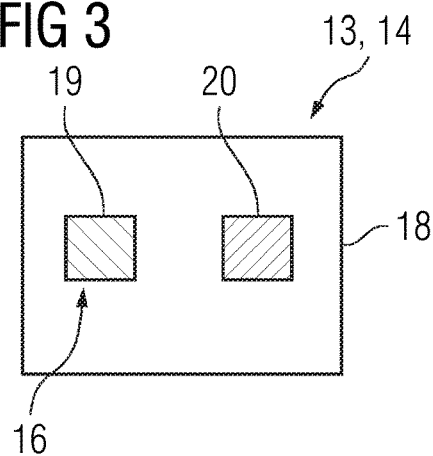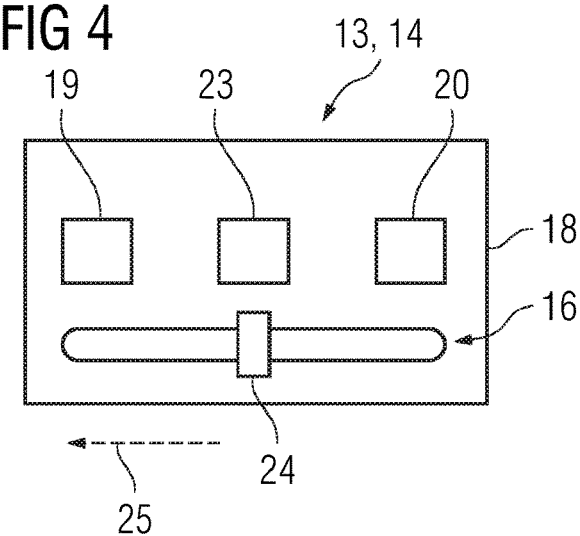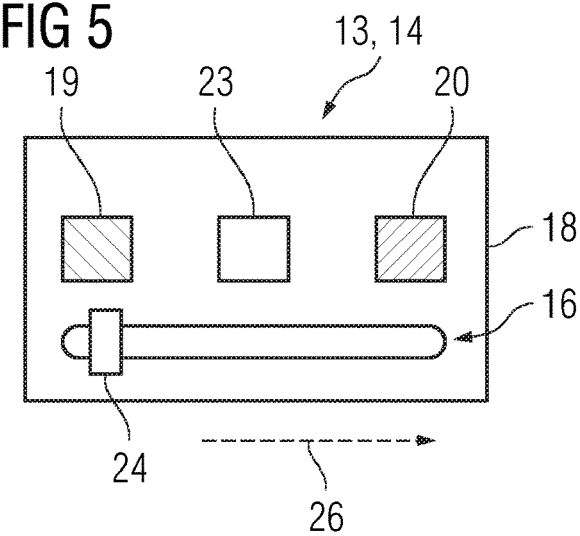

INTERVENTION SYSTEM AND METHOD FOR SUPPORTING GROUPS OF PEOPLE IN THE USE OF AN INTERVENTION SYSTEM

CROSS REFERENCE TO RELATED APPLICATIONS

This application claims the benefit of DE 10 2022 207 751.2, filed on Jul. 28, 2022, which is hereby incorporated by reference in its entirety.

FIELD

Embodiments relate to an intervention system for performing an intervention, for example a medical intervention, for example on a patient, at a first location, this being an intervention location and for supporting groups of people in the use of such an intervention system.

BACKGROUND

During medical interventions, for example minimally invasive interventions, for the purpose of diagnosis and/or therapy, it is known to insert medical instruments into the human body. Such instruments may include for example guide wires, catheters, needles, and the like. Examples of minimally invasive medical interventions include the placement of stents and the detection of stenoses. When working in the vascular system, for example navigation may be achieved by rotating and advancing a guide wire or the medical instrument, for example a catheter, at the actual point of insertion, for example the groin of the patient. It has already been proposed to support such interventions by a robot that may assume responsibility, for example for the manipulation of the at least one inserted medical instrument. Such a robot is therefore an example of an intervention device that is used during an intervention. Other examples of intervention devices may be other supporting devices, for example imaging devices such as x-ray devices having a C-arm ("angiography systems").

Intervention devices, for example, a robot require control information that is given by at least one person performing the intervention and may be given for example via a corresponding operating device assigned to the intervention device. Such an operating device may be for example an operating console but may also be a workstation computer. Depending on the application, people controlling intervention devices may be situated in the same room as the intervention device, i.e., at the intervention location, or at a remote, second location, for example in a different room, a different building, a different town and/or on a different continent. In the latter case, two "distributed" groups of people, for example a local group of people at the first location (intervention location) and a remote group of people at the second location must interact for the purpose of remotely controlling the intervention device. In this case, a group of people, for example the remote group of people, might also consist of a single person who undertakes the remote control of the intervention device, for example the remote manipulation of the robot. This may be for example the doctor providing the treatment. In the case of such "distributed" intervention, it is not always guaranteed that the groups of people are used to working together, know each other, or even speak the same language.

However, a rapid and successful intervention requires the intervention to flow smoothly. If there are misunderstandings, errors or even conflicts between the groups of people, this may have serious consequences for the flow of the intervention, and particularly for the patient. The prior art therefore proposes support systems for the step-by-step display of the (respectively role-specific) tasks for both groups of people, though this may also impede the flow, and unnecessary time-consuming safety mechanisms may be required for synchronization purposes.

In the later published German patent application DE 10 2022 204 002.3, a method for identifying a conflict is described in which first and second signals from a local and/or remote control system are checked in order to detect whether a conflict is present. If a conflict is identified, conflict information is provided, the conflict information including information that a conflict is present. In this case, use may be made for example of voice recognition, video analysis and the like in order to detect conflicts between local personnel (local group of people) and remote personnel (remote group of people) and provide a solution, at least for the future.

In the case of such "distributed" interventions, it may be particularly problematic that a first operating device may be provided at the first location, i.e., the intervention location, and a second operating device at the second location, i.e., the remote location, while the intervention device may be controlled by both. In order to allow the intervention to flow as smoothly as possible, the correct operating devices must be enabled at the correct time points in order that the corresponding group of people may provide control information for the intervention device.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide improved support and improved safety with regard to the driving of drivable intervention devices via operating devices in an intervention system, for example such that a rapid and smooth workflow is enabled and/or fundamental safety mechanisms are provided.

An intervention system is provided for performing an intervention, for example a medical intervention, for example on a patient, at a first location, this being an intervention location. The intervention system includes: at least one drivable intervention device at the first location, to be used during the intervention, a first operating device, provided at the first location, for control of the at least one intervention device by a local group of people situated at the first location, a second operating device, provided at a second location that is remote from the intervention location, for control of the at least one intervention device by a remote group of people situated at the second location, and an authorization device for authorizing the control of the at least one intervention device by the operating devices, wherein the authorization device includes a user interface for the first location and the second location respectively, the user interface including a display unit for displaying at least the authorization state of the operating device at the respective location and an operating element that is configured at least to request the authorization for the operating device of the respective location.

An intervention that is performed at least partly by involving remote control via an operating device is governed by certain fundamental rules, for example with regard to the local group of people and the remote group of people. A group of people may include only one single person. The local group of people and the remote group of people may also be referred to as local personnel and remote personnel. In this case, the remote group of people may have expertise relating to the intervention (clinical expertise in the case of a medical intervention), the remote control of the at least one intervention device and the selection of instruments, and may for example issue instructions relating to instruments that will be used by the intervention device, for example medical instruments, etc. In medical cases, the expertise of the local group of people relates for example to patient care or patient monitoring, on-site control and/or on-site handling of the at least one intervention device. Expertise includes a fundamental understanding of the intervention devices and the instruments to be used thereby, for example in relation to the correct selection and the inserting/switching thereof according to instruction from the remote group of people.

In order to offer the participating parties, in both groups of people (local and remote) in the present case, an optimal starting position for the rapid and smooth performance of the intervention, for example following the cited rules, embodiments provide an improvement by which it is possible more effectively to support distributed workflows, including the driving of intervention devices.

A dedicated user interface is provided at both the first and second locations, the user interface being part of an authorization device that controls from which operating device it is currently permitted to control the at least one intervention device. In this case, the user interface is configured such that a display unit displays the authorization state of the operating device at the respective location (i.e., the first operating device at the first location and the second operating device at the second location). Further provided as part of the user interface is an operating element via which a person in the respective group of people may request the authorization for the operating device of the respective location. Not only are the groups of people thereby informed at all times by virtue of the display unit who holds the authority to drive the intervention device, but it is also possible simply by activating the operating element to request an authorization if the current situation allows this. In other words, the user interface provides improved information and greater flexibility during the flow of the intervention.

The user interface is configured such that the communication and the assignment of operator permissions is organized as simply and intuitively as possible, this being extremely important in stressful situations for example. The display unit allows the people not only to quickly identify where the operating authority is currently held, but provision is also made for an operating element that is easy to activate and by which it is possible quickly and effectively to request the authorization for the operating device at the corresponding location. As described in greater detail below, it is advantageous in this case that the user interface, specifically the display unit, may also emit a corresponding signal, for example an optical and/or acoustic signal, in the event of a successful or unsuccessful request.

The user interface therefore allows simple and effective support of the communication in distributed workflows, i.e., between the first and the second groups of people. In this context, the authorization device provides for example corresponding prerequisites that, in terms of their functionality, are either permanently preset or may be adjusted in an adaptive manner according to the situation.

Various specific embodiments of the user interface are possible in this case, the operating element and/or the display unit optionally being provided by hardware and/or software, though other technologies including possibly future technologies may also be used. The display unit may include for example a screen, a display or similar, but may alternatively or additionally include lights, acoustic output or similar. The operating element may take the form for example of a simple button, slide control, foot pedal or similar, it being nonetheless also possible to use other input possibilities here, for example the detection of gestures via a camera, voice recognition or similar.

The user interface may include a touch screen for realizing the display unit and the operating element in combination. For example, the user interface may then be realized as a graphical interface that is nonetheless easy to hold, though the touch screen is used in a dedicated manner for the purpose of implementing the user interface of the authorization device and not for any other purposes, at least during the intervention. In this way, both the information supplied by the display unit, by the representational part of the touch screen here, and the input possibility provided by the operating element, by a section of the touch screen having correspondingly local touch sensitivity here, are available at all times. A touch screen additionally offers the advantage that a simple touch is already sufficient to activate the operating element, for example a simple tap or a simple swipe, this being advantageous precisely in situations of stress during an intervention, for example a medical intervention, and further increasing the intuitive nature and simplicity of the user interface.

As mentioned above, the intervention system is used for example for the purpose of performing a medical intervention, for example on a patient. For example, the medical intervention may be a minimally invasive examination or a minimally invasive procedure in this case. For example, the medical intervention may relate to a treatment and/or diagnosis. The medical intervention may be the insertion of an implant, for example a stent, and/or an examination involving a medical instrument, for example a catheter. The intervention may include a multiplicity of work stages, possibly building up on each other and, for example, being interdependent.

The second location is situated remotely from the first location, i.e., the intervention location. This may mean for example that there is no direct visual and/or acoustic contact between the first group of people and the second group of people. The second operating device may be situated in a different room and/or a different building and/or a different town and/or a different country and/or on a different continent than the first, local operating device. The intervention system may include a communication device for visual and/or acoustic communication between the groups of people, including for example for the purpose of giving instructions.

A first group of people ("local" team) and a second group of people ("remote" team) may jointly perform an intervention on a patient. The first group of people wants to undertake an operation at for example an imaging device as an intervention device and must therefore ensure that the second group of people does not undertake any operating actions that may negatively influence or slow down the process during this time. If the authorization and therefore the operating authority is currently held at the second operating device, the first group of people activates the operating element in order to request the authorization for their own, first operating device. The authorization device may, for example after checking appropriate prerequisites, transfer the authorization from the second operating device to the first operating device and indicate this on the display unit accordingly. The corresponding operating action may then be performed by the local, first group of people.

The authorization states may be defined via authorization modes. The authorization device is configured to implement at least the authorization modes b) and c) from the group including:
a) both operating devices disabled,
b) first operating device authorized, but second operating device disabled,
c) second operating device authorized, but first operating device disabled, and
d) both operating devices authorized.

There are expediently therefore at least authorization modes in which precisely one of the operating devices is enabled in order to send control information to the intervention device in accordance with corresponding operation by the respective group of people, during which such operation by the other operating device in each case is then not possible. Expediently, a further authorization mode may also be provided in which both operating devices are disabled. For example, if the authorization device is also configured to perform a monitoring activity or if it is otherwise established that for example a conflict between the groups of people is present, it may be expedient to temporarily prevent operating possibilities for both groups of people. It would also be possible in principle to provide a further authorization mode, in which both operating devices are enabled for the purpose of controlling the at least one intervention device. Such an authorization mode is expedient for example if the respective teams (groups of people) are perfectly used to working together, such that the occurrence of conflicting inputs to the operating devices is extremely unlikely.

In the context of such authorization modes, for example if more authorization modes than b) and c) are provided, it is also possible to realize further request possibilities via the operating element of the user interface. For example, the at least one operating element may be able to submit both a request for additional authorization of the operating device that is situated at the same location and/or a request to disable both operating devices, and a request for exclusive authorization of the operating device that is situated at the same location. If all four operating modes are provided, the authorization mode a) and/or the authorization mode d) may therefore be requested for example by the operating element, other embodiments may be possible in which the authorization mode a) of the authorization device may be assigned in connection with the monitoring activity thereof.

In an embodiment the operating element may be a slide control with rest positions assigned to various authorization modes. In an embodiment, the slide control may have a rest position for the authorization modes b) and c). A slide control is easy to operate and itself already indicates the authorization state as a result of its current rest position. The slide control or also the operating element may be assigned an actuator that, when the authorization mode changes, transfers the slide control or the operating element into a rest position that is assigned to the new authorization mode. If for example at the other user interface the authorization is requested for the operating device there, whereas the operating device assigned to this user interface was authorized previously, the authorization device may, after confirming the request via the other user interface, drive the actuator to also move the operating element, specifically the slide control, of this user interface into the corresponding new rest position. If the operating element is configured in the form of software, for example as a slide control that is displayed on a touch screen, the corresponding actuator may be understood to be software that adjust the display on the touch screen accordingly.

In an embodiment, the rest positions of the slide control may include on one side of its slide path a rest position for exclusive authorization of the operating device that is situated at the same location, a midway position of the slide path for authorizing or disabling both operating devices, and on the other side of its slide path a rest position for exclusive authorization of the operating device that is situated at the other location. The extreme positions each relate to an authorization of one of the operating devices. In a midway position, that may be characterized for example as "neutral", either both operating devices may be authorized or both operating devices may be disabled (authorization modes a) and d) respectively).

In an embodiment, if the user interface is displayed on a touch screen, it is therefore possible to provide a slide control with two ends, for example "local" and "remote". The slide control may initially be situated in a neutral position, for which purpose the display unit may select a corresponding coloration, for example of the background. By way of example, the midway position may be assigned for example the color grey. If the local group of people requires authorization of their operating device, possibly exclusively, their own side is touched or the slide control is moved there accordingly, with the coloration being adjusted correspondingly if applicable, for example the "local" side be colored green and the "remote" side red, so that the authorization state of both operating devices is indicated by the display unit that is implemented by the touch screen. An operating request from the remote group of people may be affected correspondingly, the displays on both user interfaces being adjusted in a corresponding manner. In this way, a simple, intuitively understandable, and uncluttered user interface is provided, the midway position being selectable as authorization state a) or authorization state d) depending on the specific embodiment.

As mentioned above, the display unit may be set up for color-coded display of the authorization state, for example red when the operating device assigned to the respective location is disabled and green when the operating device assigned to the respective location is authorized. The neutral position may be assigned the color "gray". For example, the display unit may also be configured to visually depict the authorization state of both operating devices, for example by a division into two sides that receive the respective color assignment in the specific example of the slide control. Such color codings, that are based on known signal colors, are further beneficial to the intuitive nature of the user interface.

A color coding is expedient not only in connection with a slide control but may also be advantageous in the case of other embodiments, for example in an embodiment in which only two control areas of a touch screen are provided, possibly as two entire sides of a touch screen, one of which is assigned to the first operating device and one to the second operating device. It is possible by touching the corresponding side or the corresponding control area to switch over the authorization, whereupon the backgrounds of the control areas, for example entire sides, then change accordingly to a color corresponding to a switching of the respective authorization states.

Expediently, provision may further be made for the display unit to have an acoustic output for outputting information relating to the result of an authorization request. In this way, users are therefore also acoustically informed whether an activation of the operating element produced the desired success. It is then also possible for an activation to take place without necessarily having to look at or continue looking at the user interface. This further simplifies the operation and use of the user interface.

For example, the authorization device may also be configured to perform a supervisory monitoring and/or decision-making activity. The authorization device may have corresponding functional units for this purpose. In other words, on the basis of the user interface, the authorization device may be configured as a supervisory decision-making entity, for example being employed or acting automatically to resolve conflicts and thus influence the grant or withdrawal of operating permissions for the corresponding operating devices.

The corresponding functional units, for example as part of a computer device, have full access (via a suitable interface) to the user interface in this case, so that is it possible to moderate or exercise influence as appropriate when necessary.

In a first embodiment relating to this, the authorization device may include a checking unit for the purpose of checking the permissibility of an authorization request on the basis of at least one refusal criterion, and for implementing the authorization request only if no refusal criterion is met. At least one refusal criterion may perform, for example a situation analysis in this case. Specifically, at least one refusal criterion may correlate the authorization requests with a flow plan of the intervention, for example with a current work stage in the flow plan, and/or for at least one refusal criterion to include a risk calculation for the intervention, for example for the patient, and/or for at least one refusal criterion to check the expiry of a time duration since the last switching of the authorization state. If for example a work stage in the workflow is specified in which a group of people is required to work on something using the operating device in a highly concentrated manner, a takeover of the authorization for this work stage may be refused for the other group of people unless additional conditions are met. A corresponding approach may be adopted if a risk that the intervention fails or otherwise has negative consequences is too great, for example if a group of people is interrupted in the middle of a partial operation. Time durations may also form part of the assessment in this context, for example a refusal of the authorization request takes place if switches occur too frequently. In this way, the authorization device exercises a moderating influence on the request proceedings, i.e., by the checking unit. It may be generally expedient in this case for the refusal criteria to be widely defined, so that influence over the interaction between the groups of people is only prescribed in extreme cases.

The authorization device may additionally include at least one authorization control unit for controlling the authorization states, at least occasionally automatically and for example on the basis of a flow plan, for example while deactivating the user interface at least occasionally, and/or for monitoring the authorization states. The authorization device may therefore also support the groups of people within a certain context, specifically by allowing authorization states to be switched automatically, for example if the end of a work stage in the flow plan has been clearly identified and the other group of people requires the authorization of its operating device for the next work stage. In this connection, influence may nonetheless be exercised only very rarely and for example only in the case of clear situations.

For example, the authorization control unit may be configured to manage conflicts in the case of conflicting requests and/or to completely take over control of the authorization state, at least occasionally, if a takeover condition is met that has been checked in the context of monitoring for example. If, for example conflicting requests are submitted simultaneously, once, or repeatedly, operational conflicts resulting from the two groups of people may be detected by the authorization device, specifically the authorization control unit. The role of a supervisory entity may be assumed here likewise, for example for conflict management, as described in the later published DE 10 2022 204 002.3 cited in the introduction. The authorization control unit may completely withdraw the control from the groups of people, for example by deactivating the user interfaces, to refer to a standard flow plan that is suitable for the current situation or ideally to the current flow plan, and to distribute or grant the authorization of the operating devices accordingly. It may generally be the that if too many conflicts arise, the control may be assigned to the supervisory system, here the authorization device, so that a corresponding solution may be selected in an adaptive manner.

Even without such conflicts, the authorization control unit may make decisions and exercise influence over the authorization of the operating devices. If for example a group of people has claimed the operating control for itself for a long time period, the authorization control unit may be suitably configured and possibly also trained via machine learning to identity and manage such situations, likewise in the context of the flow plan. It may therefore be the generally that the authorization control unit may execute a trained monitoring function for the purpose of monitoring the authorization states, and/or that the authorization control unit is configured to evaluate situation data describing the current intervention situation and/or the intervention history together with authorization data describing for example the time-relative course of authorization states in the context of the monitoring, for example when checking that the at least one takeover condition has been met. Trained monitoring functions are understood here to be for example algorithms of artificial intelligence, for example neural networks, for example deep neural networks. These may be trained accordingly on the basis of annotated recorded interventions in order to identify intervention situations in which action by the authorization control device might be required. In this case, situation data may be derived from various installed sensors or operating actions, including for example those of the operating devices, and/or general operating data, such sensors possibly including cameras and/or microphones that are directed at the groups of people for example. For the purpose of determining authorization data, the authorization states may be logged in a storage within the authorization device for example, within the authorization control unit for example.

Not every action of the authorization device must necessarily be a change of the authorization state for at least one operating device, but other actions may be performed, for example indications, warnings or similar. An actual exercise of influence by the authorization control unit may result in at least one user interface being (temporarily) deactivated and/or for example the authorization state being changed, for example in order to authorize the other operating device instead of the present one or possibly switch it into a neutral state, for example the authorization modes a) and d).

At least two intervention devices may be provided, each of the intervention devices being assigned dedicated authorization devices with respective user interfaces. If the intervention system is used for example for a medical intervention, for example a minimally invasive intervention using at least one medical instrument, intervention devices may take the form of a medical robot (for controlling the at least one medical instrument) and an imaging device, both of which may have dedicated operating devices at the first and second locations and be assigned dedicated authorization devices with respective user interfaces accordingly. The plurality of intervention devices may be assigned shared operating devices, the operating authority being allocated in a coordinated manner so that the intervention system is seen as an integrated overall system.

As mentioned above, it is also generally expedient for the at least one intervention device to include at least one medical robot, for example for activating a minimally invasive medical instrument, and/or at least one medical imaging device, for example a C-arm x-ray device. Medical robots for minimally invasive interventions on patients are known in the prior art. Examples include medical robots from Corindus Vascular Robotics Inc., Waltham, MA, USA, for example the Corindus GRX. Medical imaging devices may include, for example C-arm x-ray devices, for example mobile C-arm x-ray devices. Such C-arm x-ray devices are already proposed for use in mobile intervention units, for example stroke units, for example in combination with a medical robot.

In addition to the intervention system, embodiments also relate to a method for supporting groups of people when using an intervention system, in which method, for the purpose of controlling the authorization states, the authorization device evaluates at least one activation of an operating element at the user interfaces. All of the explanations relating to the intervention system may be applied similarly to the method, that therefore likewise allows the previously cited advantages to be achieved. This applies for example to the embodiment of the intervention system, for example of the authorization device, as a supervisory decision-making entity, i.e., for example the activity of the checking unit and/or authorization control unit, for example as part of a computing device.

BRIEF DESCRIPTION OF THE FIGURES

FIG. 3 depicts the embodiment of FIG. 2 in a second authorization mode.

FIG. 4 depicts a second embodiment of user interfaces.

FIG. 5 depicts the second embodiment in a second authorization mode.

DETAILED DESCRIPTION

Figure 1:
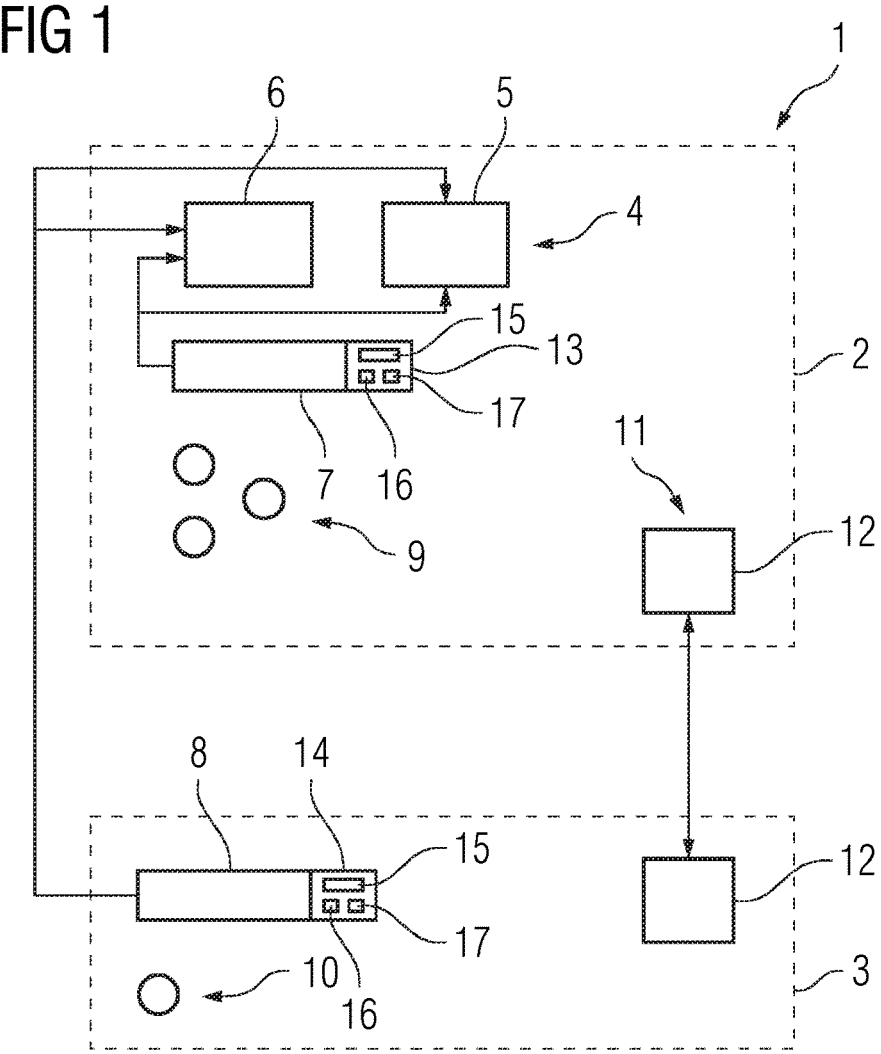
FIG. 1 depicts a schematic diagram of an intervention system according to an embodiment.

FIG. 1 depicts a schematic diagram of an intervention system according to an embodiment. This allows the distributed performance of an intervention at a first location 2, the intervention location, and a remote, second location 3. In this case, the second location 3 may be in a different room and/or a different building, possibly also in a different country or even on a different continent. In the embodiment, the intervention system is used to perform a medical intervention, for example a minimally invasive intervention, intervention on a patient. For this purpose, the intervention system 1 in the example includes two intervention devices 4, specifically a medical imaging device 5, for example an x-ray device with a C-arm, and a medical robot 6 for activating, i.e., for example moving and using, a medical instrument, for example a minimally invasive medical instrument. The intervention devices may be controlled from both the first location 2 by a first operating device 7, and the second location 3 by a second operating device 8, specifically by converting corresponding operating actions at the operating devices 7, 8 into control information that is forwarded to the intervention devices 4. For the purpose of performing the intervention, a local group of people 9 at the first location 2 and a remote group of people 10 at the second location 3 work together. In this case, the groups of people 9, 10 might also contain only one single person, as illustrated by the example of the remote group of people 10 in FIG. 1. The one person of the second group of people 10 may be for example an expert in performing the intervention, for example the lead doctor. The remote group of people 10 generally has clinical expertise in relation to the intervention, expertise in the remote control of the intervention devices 4, expertise in the selection of medical instruments, and the ability to issue instructions relating to the medical instruments, etc. that will be used. The local group of people 9 has clinical expertise in relation to patient care or patient monitoring, expertise in the on-site control and handling of the intervention devices 4, and a fundamental understanding of the medical instruments, for example with regard to the correct selection and the inserting/switching thereof according to instructions from the remote group of people 10.

In order to allow communication between the groups of people 9, 10 and allow the transfer of information between the local, first location 2 and the remote, second location 3, the intervention system 1 in this case also includes a communication system 11 including respective communication devices 12, so that for example voice communication between the groups of people 9, 10 is possible and the remote group of people 10 may be provided both with for example images and/or other situation data from the first location 2 for better assessment of the information there, and with further situation data. In this case, the communication system 11 also includes connections to the operating devices 7, 8 for example, in order to allow their communication in the intervention system 1.

In order to support the optimal utilization of the respective expertise of the groups of people 9, 10, for example with respect to the operation of the intervention devices 4, i.e., in other words to support distributed workflows (flow plans having a plurality of work stages), the intervention system 1 includes an authorization device that is able to control the authorization of the operating devices 7, 8 with regard to control of the intervention devices 4. This authorization device includes a first user interface 13 assigned to the operating device 7 at the first location 2 and a second user interface 14 assigned to the second operating device 8 at the second location 3. The user interfaces 13, 14 are also linked to the communication system 11. Each of the user interfaces 13, 14 includes a display unit 15 and an operating element 16. The display unit 15 depicts at least the authorization state of the assigned operating device 7, 8 in this way, but in the present embodiment depicts the current authorization states of both operating devices 7, 8 and the authorization mode in general. The operating element 16 allows at least an authorization request to be submitted for the assigned operating device 7, 8. Furthermore, the specific delegation of the authorization may be requested to the other operating device 7, 8 respectively and/or even requested for completely different authorization modes, for example the disabling of both operating devices 7, 8 or the authorization of both operating devices 7, 8. A computing device (not shown in detail here for the sake of clarity) of the authorization device, including a checking unit and an authorization control unit, evaluates the requests that are received via the respective operating element 16, and may for example also acknowledge their successful or unsuccessful implementation, for example using an acoustic output 17 of the display unit 15, that may output a corresponding acoustic signal for their successful or unsuccessful execution. This may also be combined with a change in the optical display of the authorization state, for example the authorization mode, the display being color-coded for example.

While both the operating element 16 and the display unit 15 may be realized as separate hardware units, for example the display unit 15 as at least one light, a display or similar and/or the operating element 16 as at least one button and/or a mechanical slide control, an embodiment provides for the display unit 15 and the operating element 16 to be integrated in the form of a touch screen, such that a graphical interactive user interface 13, 14 is therefore available.

In this case, FIGS. 2 to 6 show two embodiments for the user interface 13, 14 as a touch screen 18, the specific discussion of which will follow a basic discussion of the possible authorization modes of the authorization device. In the present case, provision is made for at least an authorization mode b) (operating device 7 authorized, operating device 8 disabled) and an authorization mode c) (operating device 8 authorized, operating device 7 disabled). An additional possible option in the embodiments, as explained below in further detail, includes an authorization mode a) (both operating devices 7, 8 disabled). Also possible is an authorization mode d), in which simultaneous operation via both operating devices 7, 8 is authorized, though this is not used in the embodiments described here.

Figure 2:
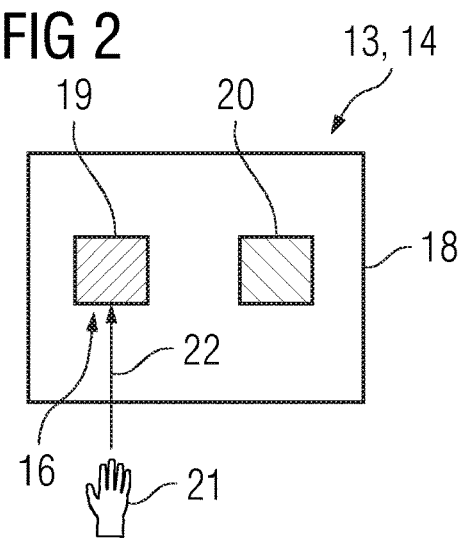
FIG. 2 depicts a first embodiment of user interfaces in a first authorization mode.

An embodiment of the user interfaces 13, 14 is explained with reference to the FIGS. 2 and 3 showing the display on a touch screen 18 that realizes the display unit 15 and the operating element 16 combined. In this case, a first area 19 on the left-hand side is assigned to the correspondingly assigned operating device 7, 8, and an area 20 on the right-hand side to the other operating device 8, 7 correspondingly. The color of the respective areas 19, 20 indicates whether the respective operating device 7, 8 is authorized to control the intervention devices 4 at the time. In this case, the color red (shown for the area 19 in FIG. 2) stands for a disabled state, and the color green (shown for the area 20 in FIG. 2) for an authorized state. In other words, an authorization mode b) or c) is present in FIG. 2, b) for the user interface 13 and c) for the user interface 14. This means that the assigned operating device 7, 8 is disabled and the other operating device 8, 7 is authorized.

For the purpose of changing this authorization state of the assigned operating device 7, 8, the area 19 is configured as an operating element 16, so that a member of the corresponding group of people 9, 10 may touch the area 19 with their hand 21 as per the arrow 22 in order to request the authorization for the assigned operating device 7, 8.

If the authorization request is implemented, the new state of the user interface 13, 14 is produced as shown in FIG. 3. It may be seen that the colors are switched such that the area 19 is lit in green indicating that the assigned operating device 7, 8 is authorized and the area 20 is lit in red indicating that the other operating device 8, 7 is not authorized. This successful switching of the authorization mode following the authorization request may also be accompanied by the output of a characteristic tone by the acoustic output 17, that may also be integrated in the touch screen.

Embodiments may include where the area 20 also represents an operating element 16, via which a request to authorize the other operating device 8, 7 may then be submitted.

Figure 6:
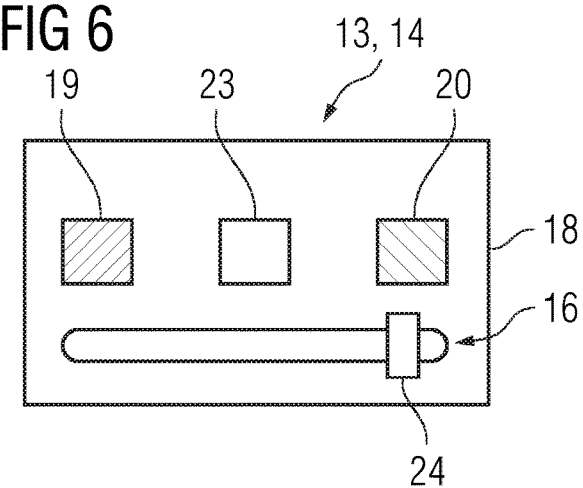
FIG. 6 depicts the second embodiment in a third authorization mode.

FIGS. 4 to 6 depicts a second embodiment of the user interface 13, 14 as a graphical representation on a touch screen 18. FIG. 4 in this case depicts a starting position, for example at the beginning of an intervention. In this case, the authorization device is in the authorization mode a) at this time, i.e., both operating devices 7, 8 are disabled, that may also be referred to as a "neutral state". For the purpose of indicating this "neutral state", the areas 19 and 20 are now supplemented by a further area 23, that is normally shown in gray (i.e., without hatching marks in FIG. 4). In order to indicate that this neutral state is established, the areas 19 and 20 are also shown in gray. The areas 19 and if applicable 20 and 23 are not used as operating elements 16 in this case, and the areas 19, 23, 20 are instead assigned a slide control 24 that extends in parallel therewith and includes a rest position for each of the areas 19, 23 and 20. The central rest position, in which the slide control 24 is shown in FIG. 4, corresponds in this case to the authorization state a), i.e., the neutral state.

If the slide control 24 at one of the user interfaces 13, 14 is then moved by a member of one of the groups of people 9, 10 as per the arrow 25 to the rest position (marginal position of the slide path) assigned to the local operating device 7, 8, the rest position being situated at the area 19, a corresponding authorization request for the local operating device 7, 8 is submitted, the display as per FIG. 5 being produced if the request is successful, whereby the area 19 is shown in green and the area 20 is shown in red. The slide control 24 is shown in the corresponding marginal rest position. If an operating action then takes place as per the arrow 26, in which the slide control 24 is moved to the opposite marginal rest position of the slide path or the region of this rest position is touched, and if the corresponding authorization request is successful, the display in FIG. 6 is produced, in which the area 19 then appears red, the area 20 appears green, and the slide control 24 is situated in the corresponding right-hand marginal position. In this second embodiment likewise, corresponding confirmation tones may be output via the acoustic output 17, that may also be integrated in the touch screen 18.

It may be noted at this point that if the authorization states, or more precisely the authorization modes, are changed, the representation on both user interfaces 13, 14 with regard to both the display unit 15 and the operating element 16 is adjusted correspondingly by the authorization device. If dedicated hardware elements are provided as operating elements 16, these may also be assigned a corresponding mechanical actuator that is able to move the operating element 16 of the other user interface 13, 14 concerned into the correct position, for example in the case of a mechanical slide control 24.

In addition to the realization possibilities presented here in the form of hardware and software, other realization possibilities for display and operating elements are also conceivable, for example as gesticulated inputs captured by a camera or similar.

Figure 7:
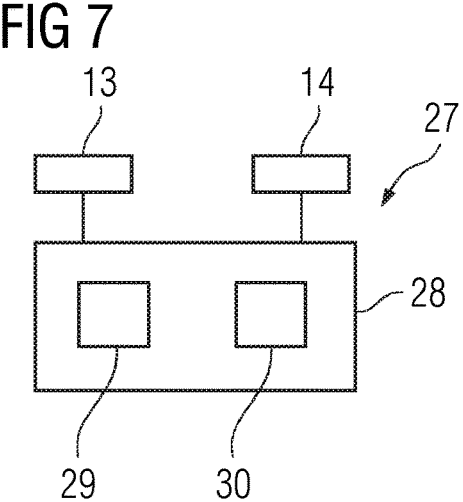
FIG. 7 depicts the functional structure of the authorization device according to an embodiment.

As mentioned above, the authorization device in the present embodiment also represents a monitoring and if necessary influential entity with regard to the authorization of the operating devices 7, 8. In this context, FIG. 7 depicts the functional structure of the authorization device 27 in greater detail. The user interfaces 13 and 14 are communicatively connected, for example via corresponding interfaces, to a computing device 28 that may be situated at the first location 2, at the second location 3 or even at a completely different location. The computing device 28 includes at least one processor and at least one storage. The storage may be used for example to hold log data or history data relating to the authorization of operating devices 7, 8 during an intervention, the data being referred to as authorization data in the following.

By the computing device 28, the authorization device 27 processes authorization requests from the user interfaces 13, 14, the authorization device 27 having a checking unit 29 that is provided for this purpose and checks, for every authorization request, whether one of at least one refusal criterion is met. If a refusal criterion is met, the authorization request is refused. For example, refusal criteria perform a situation analysis that is specific to the context of the current intervention situation, for example which work stage is currently being processed in the flow plan (workflow), and/or perform an assessment of the risk that a change of the authorization state (for example the authorization mode) would entail, for example to the patient. The authorization data may also be taken into consideration, for example in order to prevent successive switches of the authorized operating devices 7, 8 from taking place too quickly. In the case of a work stage for example in which one of the groups of people 9, 10 is required to operate at least one of the intervention devices 4 in a highly concentrated manner, the authorization of their corresponding operating device 7, 8 may not be interrupted. A refusal criterion would then be met. This applies correspondingly if an excessive risk is present.

However, the authorization device 27 is also able generally to provide a control system for the automatic support of authorizations, and to monitor the authorization operation overall. In order to achieve this, the authorization device 27 additionally includes an authorization control unit 30, that may also (for example following a check by the checking unit 29) normally effect changes in the authorization state/mode by driving the operating devices 7, 8 in a corresponding manner via a corresponding interface.

The authorization control unit 30 is configured primarily for conflict management. For example, there may be conflicting authorization requests from the user interfaces 13, 14, that must be dealt with. For example, it may then be decided on the basis of the current intervention situation, for example on the basis of the current work stage of the flow plan, which operating device 7, 8 is actually authorized or even whether both operating devices 7, 8 are temporarily authorized. It is however also conceivable for the purpose of conflict resolution to disable both operating devices 7, 8 and/or the user interfaces 13, 14, at least temporarily. Further measures and actions for conflict resolution may also be provided by the authorization device 27, for example the authorization control unit, for example as described in the later published patent application DE 10 2022 204 002.3 cited in the introduction.

The authorization control unit 30 is also configured for example to control the authorization states automatically, at least occasionally, for example in accordance with a flow plan. As a function of the work stage and for example at the beginning thereof, a predetermined operating device 7, 8 may be authorized and other operating device 8, 7 disabled.

Finally, the authorization control unit 30 may also perform monitoring of the authorization operation on the basis of the authorization data and situation data that may be received via a corresponding interface. Situation data may originate for example from sensors such as cameras, microphones or similar, but may also include operating data from the operating devices 7, 8 and the intervention devices 4. If for example excessively rapid and frequent changes in the authorization mode take place, this may indicate a conflict and it is then possible to exercise influence, specifically for example by temporarily deactivating the user interfaces 13, 14 and allowing control of the authorization states to be affected completely automatically by the authorization device 27, specifically the authorization control unit 30. This may also relate to risk situations or situations in which the operating authority remains with a group of people 9, 10 for too long.

In this regard, the authorization control unit 30 may be used to execute at least one monitoring function that has been trained by machine learning and is able to identify intervention situations in which is it applicable to exercise moderation or influence, for example in the context of the flow plan. It is not always immediately necessary in this case to exercise influence over the authorization states and/or to disable user interfaces 13, 14, but the authorization device 27 may also initiate other actions via the authorization control unit 30, for example output indications and/or warnings, that may be affected via the display unit 15 for example or via further display.

Figure 8:
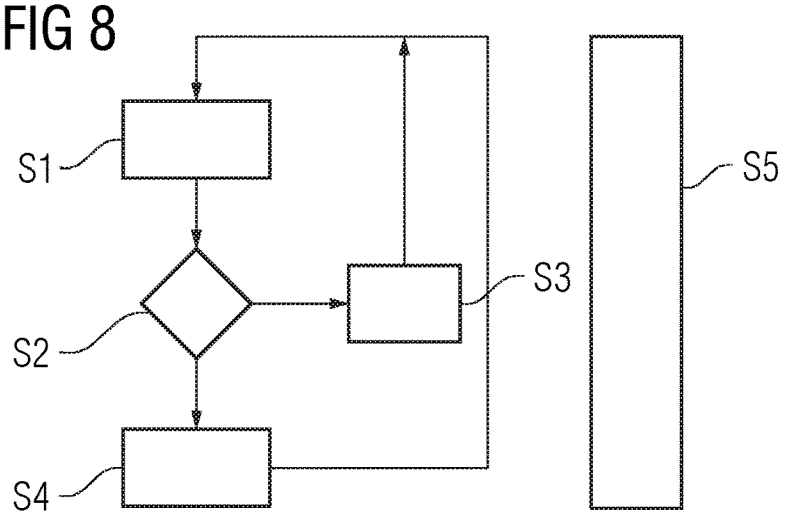
FIG. 8 depicts a flow plan of an embodiment of a method.

FIG. 8 depicts a flow plan of an embodiment of the method. In a step S1, an authorization request is received via one of the operating elements 16 of the user interfaces 13, 14. In a step S2, the checking unit 29 is used to check whether a refusal criterion is met. If this is the case, an output such as for example a characteristic tone via the acoustic output 17 takes place in a step S3, indicating that the authorization request has been refused. A reason may also be output if applicable.

However, if no refusal criterion is met, the authorization mode is switched accordingly by the authorization control unit 30 in a step S4, this in turn being confirmed by a characteristic tone. The outputs of the display 15 are adjusted accordingly.

During these steps, and more precisely during the entire time of the intervention, monitoring runs in parallel in a step S5, wherein control of the authorization states, the control being at least occasionally automatic, and conflict management may also take place as described in addition to the monitoring, all of these likewise being affected as described by the authorization control unit 30.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An intervention system for performing a medical intervention at a first location, the intervention system comprising:
   at least one intervention device at the first location to be used for an intervention;
   a first operating device provided at the first location for control of the at least one intervention device by a local group of people situated at the first location;
   a second operating device provided at a second location that is remote from the first location, for control of the at least one intervention device by a remote group of people situated at the second location; and
   an authorization device for authorizing the control of the at least one intervention device by the first operating device and the second operating device, wherein the authorization device includes a first user interface for the first location and a second user interface for the second location, the first user interface and the second user interface comprising a display unit for displaying at least an authorization state of the first operating device and the second operating device at a respective location and an operating element that is configured at least to request the authorization for the first operating device and the second operating device of the respective location.

2. The intervention system of claim 1, wherein the authorization device is configured to implement at least one of authorization modes from a group comprising: both the first operating device and second operating device disabled, the first operating device authorized, but the second operating device disabled, the second operating device authorized, but the first operating device disabled, and both the first operating device and the second operating devices authorized.

3. The intervention system of claim 2, wherein the operating element is configured to submit a request for additional authorization of an operating device that is situated at a same location, a request to disable both operating devices, and a request for exclusive authorization of the operating device that is situated at the same location.

4. The intervention system of claim 2, wherein the operating element is a slide control with rest positions assigned to various authorization modes.

5. The intervention system of claim 4, wherein rest positions of the slide control comprise on a first side of the slide control's slide path is a rest position for exclusive authorization of an operating device that is situated at a same location, a midway position of the slide path for authorizing or disabling both operating the first operating device and second operating device, and on a second side of the slide control's slide path is a rest position for exclusive authorization of an operating device that is situated at the other location.

6. The intervention system of claim 1, wherein the display unit is configured for color-coded display of the authorization state, red when an operating device assigned to the respective location is disabled and green when the operating device assigned to the respective location is authorized, and/or includes an acoustic output for outputting information relating to a result of an authorization request.

7. The intervention system of claim 1, wherein at least one of the first user interface or the second user interface includes a touch screen for realizing the display unit and the operating element in combination.

8. The intervention system of claim 1, wherein the authorization device includes a checking unit for checking a permissibility of an authorization request based on at least one refusal criterion and for implementing the authorization request only if no refusal criterion is met.

9. The intervention system of claim 8, wherein at least one refusal criterion correlates the request with at least one of a flow plan of the intervention, a risk calculation for the intervention, or checks an expiry of a time duration since the last switching of the authorization state.

10. The intervention system of claim 1, wherein the authorization device further includes at least one authorization control unit configured for controlling authorization states automatically based on a flow plan while deactivating the first user interface or the second user interface at least occasionally, the at least one authorization control unit further configured for monitoring the authorization states.

11. The intervention system of claim 10, wherein the authorization control unit is configured to manage conflicts for conflicting requests and/or to completely take over control of the authorization state, at least occasionally, if at least one takeover condition, that has been checked during a course of monitoring, is met.

12. The intervention system of claim 11, wherein the authorization control unit executes a trained monitoring function for monitoring the authorization states and the authorization control unit is configured to evaluate situation data describing a current intervention situation and an intervention history together with authorization data describing a time-relative flow of authorization states in a context of the monitoring, when checking that the at least one takeover condition has been met.

13. The intervention system of claim 1, wherein at least two intervention devices are provided, wherein the at least two intervention devices are each assigned dedicated authorization devices with respective user interfaces.

14. The intervention system of claim 1, wherein the at least one intervention device comprises at least one medical robot for activating a minimally invasive medical instrument and/or at least one medical imaging device.

15. A method for supporting groups of people in the use of an intervention system that comprises at least one intervention device at a first location to be used for an intervention, a first operating device provided at the first location for control of the at least one intervention device by a local group of people situated at the first location, and a second operating device provided at a second location that is remote from the first location, for control of the at least one intervention device by a remote group of people situated at the second location, the method comprising:
   monitoring, by an authorization device comprising a first user interface for the first location and a second user interface for the second location, the first user interface and the second user interface comprising a display unit for displaying at least an authorization state of the first operating device and the second operating device at a respective location and an operating element that is configured at least to request an authorization for the first operating device and the second operating device of the respective location, the operating element that is configured at least to request an authorization for the first operating device and the second operating device of the respective location; and
   authorizing, by the authorization device, based on at least one activation of an operating element of the first user interface or the second user interface, the control of the at least one intervention device by the first operating device or second operating device.

16. The method of claim 15, wherein the authorization device is configured to implement, based on the at least one activation, at least one of authorization modes from a group comprising: both the first operating device and second operating device disabled, the first operating device authorized, but the second operating device disabled, the second operating device authorized, but the first operating device disabled, and both the first operating device and the second operating devices authorized.

17. The method of claim 15, further comprising:
submitting, by the operating element, a request for additional authorization of an operating device that is situated at a same location, a request to disable both the first operating device and second operating devices, and a request for exclusive authorization of the operating device that is situated at the same location.

18. The method of claim 15, wherein the operating element is a slide control with rest positions assigned to various authorization modes.

19. The method of claim 18, wherein rest positions of the slide control comprise on a first side of the slide control's slide path is a rest position for exclusive authorization of an operating device that is situated at the same location, a midway position of the slide path for authorizing or disabling both operating the first operating device and second operating device, and on a second side of the slide control's slide path is a rest position for exclusive authorization of an operating device that is situated at the other location.

20. The method of claim 15, wherein at least one of the first user interface or the second user interface includes a touch screen for realizing a display unit and the operating element in combination.

* * * * *